United States Patent Office 3,565,907
Patented Feb. 23, 1971

3,565,907
METHOD OF PURIFYING ISOMERS OF 6-PHENYL-2,3,5,6-TETRAHYDROIMIDAZO[2,1-b]THIAZOLE
Milon Walker Bullock, Hopewell, N.J., assignor to American Cyanamid Company, Stamford, Conn., a corporation of Maine
No Drawing. Continuation-in-part of application Ser. No. 573,186, Aug. 18, 1966. This application Apr. 23, 1969, Ser. No. 818,783
Int. Cl. C07d 99/10
U.S. Cl. 260—306.7         10 Claims

ABSTRACT OF THE DISCLOSURE

This invention describes a method of purifying isomers of 6-phenyl-2,3,5,6-tetrahydroimidazo[2,1-b]thiazole by the use of isomeric forms of 10-camphorsulfonic acid and derivatives thereof. The products are useful as anthelmintics.

---

This application is a continuation-in-part of application Ser. No. 573,186, filed Aug. 18, 1966, and now abandoned.

DESCRIPTION OF THE INVENTION

In my pending application, Ser. No. 691,710, filed Dec. 19, 1967 now U.S. Patent No. 3,463,786, which is a continuation-in-part of application Ser. No. 554,307, filed June 1, 1966, and now abandoned, there is described a process for the separation of dl 6-phenyl-2,3,5,6-tetrahydromidazo[2,1-b]thiazole into its dextro and levo rotary enantiomorphs. I have now discovered a useful and novel process for separating the resolved amines for their d- or 1-10-camphorsulfonic acid salts and in the same process obtain the d- or 1-camphorsulfonic acid in the form of a complex salt of the dl-amine which is a suitable starting material for carrying out the separation dl-amine into its d- and l-forms.

A salient advantage of this process is that end products of very high optical purity can be obtained from the intermediate d- or 1-10-camphorsulfonic acid salts which are optically impure. In fact, there is no real advantage of employing a salt that is more pure than can be obtained from a direct crystallization and filtration of the chloroform solvate. Essentially pure d- and l-6-phenyl-2,3,5,6-tetrahydromidazo[2,1-b]thiazole can be obtained from the nearly optically pure chloroform solvate or from the mother liquor from which the solvate was separated.

Both d (+) 6 - phenyl - 2,3,5,6-tetrahydroimidazo[2,1-b]thiazole d-10-camphorsulfonate and 1 (—) 6-phenyl-2,3,5,6-tetrahydroimidazo[2,1-b]thiazole d-10-camphorsulfonate are relatively soluble in many solvents. When a solution of one of these resolved salts in a suitable solvent is treated with some of the dl 6-phenyl-2,3,5,6-tetrahydroimidazo[2,1-b]thiazole, an exchange occurs and a precipitate of a complex d-10-camphorsulfonate salt of the dl-base crystallizes from the solution. The composition of this precipitate varies slightly depending on the composition of the solution from which it separated; but it has approximately the same composition as the racemic dl 6 - phenyl-2,3,5,6-tetrahydroimidazo[2,1-b]thiazole d-10-camphorsulfonate that is obtained by combining equal molar amounts of the dl-amine with the d-10-camphorsulfonic acid. The exact composition of the salt can be determined by measuring the specific rotation if desired. The salt can be separated into its two diastereo-isomers by treatment with chloroform and separating the insoluble chloroform solvate. By the addition of the proper amount of the dl-amine to the resolved salt, it is possible to recover essentially all of the d-10-camphorsulfonic acid as a complex salt of the dl-base and at the same time, leave only the optically pure amine in solution from which it can be recovered in high yield by evaporation of the solvent or can be precipitated as the hydrochloride or other salt.

The solvents used to carry out the exchange reaction are solvents in which the resolved camphorsulfonate salt is more soluble than is the essentially racemic complex salt that crystallized out. In practice, we have found that effective solvents are those in which the racemic amine salt of the camphorsulfonic acid has a solubility of less than about 0.25%. Such solvents include low molecular weight, aliphatic ketones having from 1 to 6 carbon atoms and, for example, are acetone, butanone, 2 or 3 pentanone, 2 or 3 hexanone, 4-methyl-2-pentanone, pinacolin (3,3-dimethyl-2-butanone), and methylisobutyl ketone; aliphatic hydrocarbons of 2 to 6 carbons, and monocyclic aromatic hydrocarbons of 6 to 10 carbons such as benzene, toluene, xylene, and trimethylbenzene.

While I have found that the process of the present invention can be effectively carried out using a single solvent system, I have also found that the quality of product obtained may be improved and the filterability of the crystallines camphorsulfonic acid salts formed in such reaction enhanced if a two solvent system is employed.

This two solvent system involves dissolving the reactants in a solvent in which they are very soluble such as lower alkyl alcohols having from 1 to 4 carbon atoms including methanol, ethanol, propanol, isopropanol, butanol and isobutanol; lower alkyl nitriles having from 1 to 5 carbon atoms such as acetonitrile, propionitrile and butyl nitrile; halogenated lower alkyls having from 1 to 4 carbon atoms and including chloroform, trichloroethane, dichloroethylene, methylene chloride, butylchloride and the like and then to add a second solvent in which the complex salt is very insoluble (i.e., less than 0.25% soluble) and in which the free base is soluble. It is preferred that the first solvent be lower boiling than the second so that it can be distilled from the reaction mixture leaving only the solvent in which all of the camphorsulfonate salts have almost no solubility.

In this preferred system, the reactants are first dissolved in a solvent selected from the group consisting of lower alkyl alcohols having from 1 to 4 carbon atoms; lower alkyl nitriles having from 1 to 5 carbon atoms and halogenated lower alkyls having from 1 to 4 carbon atoms. The solvent mixture is then admixed with a second solvent selected from the grolp consisting of low molecular weight aliphatic ketones having from 1 to 6 carbon atoms, aliphatic hydrocarbons ($C_2$–$C_6$) and monocyclic aromatic hydrocarbons ($C_6$–$C_{10}$). The complex camphorsulfonate salts crystallize or precipitate on admixture of the second solvent and are readily separated from the mixture by a convenient means as by filtration, centrifugal or the like. The free base being soluble in the second solvent is left in solution and can be recovered therefrom as by distillation or conversion to the acid addition salts thereof. In practice, the two solvent mixture is generally heated to boiling to distill off the first solvent leaving the readily filterable crystalline camphorsulfonate salts dispersed in the second solvent. These salts are then separated from the second solvent which contains the dissolved optically pure free base. Distillation of the first solvent can usually be affected at atmospheric pressure at a temperature between about 40° C. and 200° C. depending on the solvents employed. However, it is of course obvious that the first solvent may also be removed from the mixture under subatmospheric pressure, in which case the distillation temperature can be well below the range normally employed for distillation at atmospheric pressure.

Following separation of the first solvent from this mixture, the crystalline camphorsulfonate salts are separated from the second solvent by filtration, centrifugation or similar means. The optically pure free base may then be recovered from the remaining or second solvent as by distillation or by conversion to an acid addition salt. This can be accomplished by treatment of the solvent solution with a hydrohalide in a lower alcohol to precipitate the salt.

In carrying out the present reaction, methylene chloride, methanol, or chloroform are among the good first solvents. 4-methyl-2-pentanone or toluene are excellent second solvents. The preferred solvent combination is chloroform followed by toluene. For each salt and for each solvent system, there is an optimum amount of the dl-amine to add. The addition of too much dl-amine will yield an optically impure amine in the supernatant solution; and the addition of too small amount will give a lower yield of optically active amine. When the solvent is a chloroform and toluene mixture and the salt is d (+) 6-phenyl-2,3,5,6 - tetrahydroimidazo[2,1-b]thiazole d-10-camphorsulfonate, the optimum amount of dl-base is near 90 mole percent of the salt. With the same solvent system, but with 1 (—) 6-phenyl-2,3,5,6-tetrahydroimidazo[2,1-b]thiazole d-10-camphorsulfonate, the optimum amount of dl-base to add is near 80 mole percent of the salt in solution. If too little of the dl-base is added, there is no net loss of anything since the excess optically active amine camphorsulfonate will be precipitated along with racemic salt and will be recovered in the next resolution. If too much of the dl-base is added and an amine of unsatisfactory optical purity is obtained, the product can be purified in the following way: the impure base is dissolved in a suitable solvent, preferably chloroform, and d-10-camphorsulfonic acid is added in a molar amount equal to a slight excess of twice the mole fraction of the optical impurity. The addition of a suit-solvent, preferably toluene, will cause the separation of a complex d-10-camphorsulfonate salt of the dl-amine which removes the impurity leaving only optically pure amine in solution.

Although the above discussion is limited to the operation of the process with d-10-camphorsulfonic acid salts, the process is identical for l (—)-10-camphorsulfonic acid salts and these are included in the invention.

Preparation of the starting materials 1 (—) 6-phenyl-2,3,5,6 - tetrahydroimidazo[2,1-b]thiazole d-10-camphorsulfonate; l (—) 6-phenyl-2,3,5,6-tetrahydroimidazo[2,1-b]thiazole l-10-camphorsulfonate; d (+) 6-phenyl-2,3,5,6-tetrahydroimidazo[2,1 - b] - thiazole d-10-camphorsulfonate; and d (+) 6-phenyl-2,3,5,6-tetrahydroimidazo[2,1-b]thiazole l-10-camphorsulfonate may be achieved by treating dl-6-phenyl-2,3,5,6-tetrahydroimidazo[2,1-b]thiazole with chloroform and a compound selected from the group consisting of l-10-camphorsulfonic acid and d-10-camphorsulfonic acid to form the corresponding dl 6-phenyl - 2,3,5,6 - tetrahydroimidazo[2,1-b]thiazole d-10-camphorsulfonate and dl 6-phenyl-2,3,5,6-tetrahydroimidazo[2,1-b]thiazole l-10-camphorsulfonate; crystallizing the chloroform solvate; separating the mother liquor from said solvate; and separating from said solvate, by evaporation of solvent, a compound selected from the group consisting of d (+) 6-phenyl-2,3,5,6-tetrahydroimidazo[2,1-b]thiazole d-10-camphorsulfonate and l (—) 6-phenyl-2,3,5,6 - tetrahydroimidazo[2,1-b]thiazole l-10-camphorsulfonate; evaporating the said mother liquor; treating the residue with hot acetone and separating an insoluble racemic salt selected from the group consisting of dl 6-phenyl - 2,3,5,6 - tetrahydroimidazo[2,1-b]thiazole d-10-camphorsulfonate and dl 6-phenyl-2,3,5,6-tetrahydroimidazo[2,1-b]thiazole l-10-camphorsulfonate; separating a compound selected from the group consisting of l (—) 6 - phenyl-2,3,5,6-tetrahydroimidazo[2,1-b]thiazole d-10-camphorsulfonate and d (+) 6-phenyl-2,3,5,6-tetrahydroimidazo[2,1-b]thiazole l-10-camphorsulfonate.

The l (—) 6-phenyl-2,3,5,6-tetrahydroimidazo[2,1-b]-thiazole is a highly effective anthelmintic with relatively low toxicity, it being less toxic than the corresponding dl compound.

The following specific examples illustrate in detail the operation of this invention.

Example 1

A solution of 4.37 grams (10 millimoles) of d (+) 6 - phenyl-2,3,5,6-tetrahydroimidazo[2,1-b]thiazole d-10-camphorsulfonate in 10 milliliters of hot chloroform is treated with a solution of 1.84 grams (9 millimoles) of dl 6 - phenyl - 2,3,5,6-tetrahydroimidazo[2,1-b]thiazole dissolved in 20 milliliters of toluene. A crystalline solid begins separating immediately. The mixture is boiled to distill out the chloroform. The crystalline product is collected by filtration and the filter cake washed with toluene. The solid d-10-camphorsulfonate salts weigh 4.27 grams (9.8 millimoles), 98% yield, melting point 194°–196° C. and has a specific rotation, $\alpha_D^{25}$ of +21.7° (C.=15 in water). The toluene filtrate, which contains the liberated d (+) 6-phenyl-2,3,5,6-tetrahydroimidazo[2,1-b]thiazole is treated with 4 milliliters of 3.8 N isopropanolic hydrogen chloride to prepare the hydrochloride. The precipitated hydrochloride is recovered by filtration and washed with acetone. The yield is 2.16 grams (8.95 millimoles), 99% melting point 226°–228° C. $\alpha_D^{25}$ +122.5° (C.=10 in water). The product is 98% optically pure d (+) 6-phenyl - 2,3,5,6-tetrahydroimidazo[2,1-b]thiazole hydrochloride.

Example 2

A solution of 4.37 grams (10 millimoles) of l (—) 6-phenyl - 2,3,5,6 - tetrahydroimidazo[2,1-b]thiazole d-10-camphorsulfonate dissolved in 10 milliliters of hot chloroform is treated with a solution of 1.64 (8 millimoles) of dl - 6 - phenyl-2,3,5,6-tetrahydroimidazo[2,1-b]thiazole in 20 milliliters of hot toluene. A crystalline product begins separating immediately. The reaction mixture is allowed to cool to room temperature and the crystals which have separated are collected by filtration and washed with toluene. This complex d-10-camphorsulfonate salt weighs 4.14 grams, melting point 192°–194°, and has a specific rotation $\alpha_D^{25}$ of zero degrees (C.=10% in water). Concentration of the mother liquor to remove the chloroform precipitates an additional 0.13 gram of the d-10-camphorsulfonate, melting point 172°–185° C. bringing the total recovery of the d-10-camphorsulfonic acid, as the salt, to 4.27 grams (9.8 millimoles) or 98% theory. The toluene filtrate containing the liberated l (—) 6-phenyl-2,3,5,6-tetrahydroimidazo[2,1-b]thiazole is treated with 4 milliliters of 3.8 N isopropanolic hydrogen chloride to prepare the hydrochloride. The l (—) 6-phenyl-2,3,5,6-tetrahydroimidazo[2,1-b]thiazole hydrochloride, which is recovered by filtration, weighs 1.88 grams (7.86 millimoles), 98% of theory. It melts at 226°–228° C. and has a specific rotation $\alpha_D^{25}$ of —120° indicating that the optical purity of the product is 97%.

Example 3

A solution of 4.37 grams (10 millimoles) of l (—) 6-phenyl - 2,3,5,6-tetrahydroimidazo[2,1 - b]thiazole d-10-camphorsulfonate is dissolved in a mixture of 2 milliliters of water and 20 milliliters of acetone. This solution is treated with a solution of 2.04 grams (10 millimoles) of dl 6-phenyl-2,3,5,6-tetrahydroimidazo[2,1-b]thiazole in 20 milliliters of acetone. On standing 2.8 grams of crystals separates. This crop has a melting point 194°–195° C. and has $\alpha_D^{25}$ +9.25° (C.=10% in water). A second crop is obtained by evaporating to dryness and slurrying the residue with acetone. This crop 1.4 grams, melting point 194°–195° C. and has $\alpha_D^{25}$ +2.3° (C.=10% in water). The total recovery of the camphorsulfonic acid (as the salt) is then 4.2 grams of 96% of the theoretical. Treatment of the acetone filtrate with isopropanolic hydrogen chloride gives 2.35 grams (98% yield) of l (—) 6-phenyl-2,3,5,6-tetrahydroimidazo[2,1-b]thiazole, melting point 224°–228° C. This material has a specific rotation $\alpha_D^{25}$ of —106° showing that the optical purity is 92%.

Example 4

A solution of 4.37 grams (10 millimoles) of l (—) 6-phenyl - 2,3,5,6 - tetrahydroimidazo[2,1-b]thiazole d-10-camphorsulfonate in 5 milliliters of hot chloroform is treated with a solution of 2.64 grams (10 millimoles) of dl 6-phenyl-2,3,5,6-tetrahydro[2,1-b]thiazole acetate salt in 20 milliliters of acetone. A crystalline product separates rapidly. The crystals are recovered by filtration and washed with acetone. They amount to 3.78 grams and have a melting point of 196° C. and $\alpha_D^{25}$ +7.1°. A second crop weighs 0.21 gram, melting point 195°–196° C. and is obtained by evaporating the acetone chloroform mixture and replacing with acetone. The acetone filtrate is used to prepare the hydrochloride, weight 2.50 grams, melting point 224°–234° C. The salt has a specific rotation, $\alpha_D^{25}$ —101° (C.=10% in water) and is 89.5% optically pure.

Example 5

A solution is prepared by dissolving 43.66 grams (0.1 mole) of dl-6-phenyl - 2,3,5,6 - tetrahydroimidazo[2,1-b]thiazole d-10-camphorsulfonate in 160 milliliters of chloroform. The mixture is refrigerated three hours at —5° C. and the precipitated d (+) 6-phenyl-2,3,5,6-tetrahydroimidazo[2,1 - b]thiazole d - 10 - camphorsulfonate chloroform solvate is removed by filtration. The yield of this fraction is 0.0443 mole, 88.6% of theory, and the dry nonsolvated weight is 19.3 grams. The dry salt has $\alpha_D^{25}$ +83.0 (C.=10% in water).

The salt is dissolved in 38 milliliters of chloroform by warming. Now 9.0 grams (0.0436 mole) of dl 6-phenyl-2,3,5,6-tetrahydroimidazo[2,1-b]thiazole is added. When this has dissolved, 50 milliliters of toluene is added. After the crystallization is complete, most of the solvents are stripped off in a rotary evaporator to remove chloroform. Now 25 milliliters of toluene are added and the d-10-camphorsulfonate salt is recovered by filtration, washed with toluene, and dried. The recovery is 18.60 grams (0.426 mole), 97.3%, melting point 194°–195° C., $\alpha_D^{25}$ +19.3 (C.=10% in water).

The toluene solution from which the salt is filtered is evaporated to obtain the d (+) 6-phenyl-2,3,5,6-tetrahydroimidazo[2,1-b]thiazole, weight 9.0 grams (the theoretical amount). This product can be racemized to obtain the dl-base. In this case, however, it is converted to the hydrochloride which weighs 9.9 grams (0.0411 mole), 96.6% yield, melting point 225°–240° C. The salt has $\alpha_D^{25}$ +113° (C.=10% in water) showing that it is 94.5% optically pure.

The chloroform filtrate from which the solvate is obtained is treated with 9.0 grams (0.0443 mole) of dl 6-phenyl - 2,3,5,6 - tetrahydroimidazo[2,1-b]thiazole. It is found from other experiments going on simultaneously that this is too much to obtain good optical purity so 2.06 grams (0.0088 mole) of d-10-camphorsulfonic acid is added to combine with the excess. The chloroform is evaporated to a low volume and 100 milliliters of toluene are added. A salt crystallized immediately. The mixture is concentrated to remove chloroform and some toluene is added back. The salt is recovered by filtration and washed with toluene. The dry salt weighs 27.5 grams, melting point 192°–194° C. and has $\alpha_D^{25}$ +2.5°. The recovery of the d-10-camphorsulfonic acid salt is 97.5% of theory.

The toluene filtrate is treated with 15 milliliters of 3.8 N isopropanolic hydrogen chloride which precipitates the hydrochloride of l (—) 6 - phenyl - 2,3,5,6 - tetrahydroimidazo[2,1-b]thiazole. The yield is 8.05 grams, 94% of theory based on net dl-base added. The product melting point is 226°–228° C. and has $\alpha_D^{25}$ —119.5° (C.=10% in water) and is 97% optically pure.

Example 6

A solution of 8.9 grams (43.5 millimoles) of optically impure $\alpha_D^{25}$ —67.4°, 87.5% levo isomer, l-6-phenyl-2,3,5,6-tetrahydroimidazo[2,1-b]thiazole in approximately 25 milliliters of chloroform is treated with 3.06 grams (13.1 millimoles) of d-10-camphorsulfonic acid. Now 50 milliliters of toluene is added which causes a salt to precipitate within a few minutes. After the salt has crystallized, the reaction mixture is concentrated on a rotary evaporator to remove the chloroform and 50 milliliters additional toluene is added. The salt is recovered by filtration and washed with toluene and then with acetone to hasten drying. The recovered d-10-camphorsulfonic acid salt weighs 4.90 grams (12 millimoles), 92% of theory, melting point 189°–192° C. $\alpha_D^{25}$ —7.5 (C.=10% in $H_2O$).

The toluene filtrate is clarified from a slight turbidity by treating with a little charcoal and filtering. This filtrate is treated with 15 milliliters of 3.8 N isopropanolic hydrogen chloride and the precipitated hydrochloride recovered by filtration. The cake is washed with toluene followed by acetone. The yield of l (—) 6-phenyl-2,3,5,6-tetrahydroimidazo[2,1-b]thiazole hydrochloride is 6.60 grams (27.4 millimoles), 84% of the theoretical 32.6 millimoles available, melting point 226°–228° C. $\alpha_D^{25}$ —122.5° (C.=12% in water), 98% optically pure.

Example 7

The above examples illustrate the use of d-10-camphor-10-sulfonic acid in the resolution of the dl-base and recoveries of the resolved amines. The l (—)-10-camphorsulfonic acid can be substituted for the d-isomer in every step. The yields, melting points, and other physical constants are all identical except for the rotation of the plane of polarized light. Rotations will be equal but opposite in sign and the compounds obtained in each step will be the mirror image of those obtained with the d (+)-acid. It is very practical to use the l-10-camphorsulfonic acid. If it is desired to use this optical isomer, it is best obtained by contacting dl-10-camphorsulfonic acid with l (—) 6-phenyl-2,3,5,6-tetrahydroimidazo[2,1-b]thiazole in chloroform. The solvate which separates is l (—) 6-phenyl-2,3,5,6-tetrahydroimidazo[2,1-b]thiazole l-10-camphorsulfonate. It is the mirror image of the starting material in Example 1. When this salt is carried through the procedure detailed in Example 1, the products are the l (—)-10-camphorsulfonate salt of dl 6-phenyl-2,3,5,6-tetrahydroimidazo[2,1-b]thiazole and l (—) 6-phenyl-2,3,5,6-tetrahydroimidazo[2,1-b]thiazole hydrochloride.

The camphorsulfonate salt obtained above can be used in the procedure detailed in Example 5. The products will be the mirror image of those obtained in Example 5.

Example 8

A solution of 0.1 mole of d (+) 6-phenyl-2,3,5,6-tetrahydroimidazo[2,1-b]thiazole l-10-camphorsulfonate in 200 ml. of hot absolute ethanol is admixed with 0.1 mole of dl 6-phenyl-2,3,5,6-tetrahydroimidazo[2,1-b]thiazole in 400 ml. of xylene. The mixture is boiled to remove the ethanol and then filtered to separate the complex l-10-camphorsulfonate salt. The d (+) 6-phenyl-2,3,5,6-tetrahydroimidazo[2,1-b]thiazole is in solution in the xylene and may be recovered as the hydrohalide by treatment with an alcoholic solution of a hydrohalide.

Example 9

A solution of (0.05 mole) of l (—) 6-phenyl-2,3,5,6-tetrahydroimidazo[2,1-b]thiazole l-10-camphorsulfonate in 20 ml. of hot acetonitrile is treated with a solution of (0.05 mole) of dl 6-phenyl-2,3,5,6-tetrahydroimidazo[2,1-b]thiazole in 40 ml. of methylisobutyl ketone. The mixture is heated to boiling and the acetonitrile distilled off leaving the crystalline complex l-10-camphorsulfonate salts in the ketonic mixture. These salts are then separated by filtration leaving the optically pure l-free base in the ketonic solution. Recovery of the l-free base can be accomplished as described in Example 2.

I claim:
1. A method of producing in solution a compound selected from the group consisting of d (+) 6-phenyl-2,3,5,6-tetrahydroimidazo[2,1-b]thiazole and l (—) 6-phenyl-2,3,5,6 - tetrahydroimidazo[2,1 - b]thiazole comprising; contacting a compound selected from the group consisting of d (+) 6-phenyl-2,3,5,6-tetrahydroimidazo-[2,1-b]thiazole d-10-camphorsulfonate; l (—)-6-phenyl-2,3,5,6-tetrahydroimidazo[2,1-b]thiazole d-10 - camphorsulfonate; l (—) 6-phenyl-2,3,5,6-tetrahydroimidazo-[2,1-b]thiazole 1-10-camphorsulfonate; and d (+) 6-phenyl-2,3,5,6-tetrahydroimidazo[2,1 - b]thiazole l - 10-camphorsulfonate with not more than one molar equivalent of dl 6-phenyl-2,3,5,6-tetrahydroimidazo - [2,1 - b]thiazole in a solvent in which the racemic amine salt of the camphorsulfonic acid has a solubility of less than about 0.25% and separating the insoluble precipitated salt leaving the substantially pure optically active amine in solution.

2. A method of purifying in solution an optically impure compound selected from the group consisting of d (+) 6-phenyl-2,3,5,6 - tetrahydroimidazo[2,1 - b]thiazole and l (—) 6-phenyl-2,3,5,6-tetrahydroimidazo-[2,1-b]thiazole comprising; contacting said compound with at least one mole for each mole of dl 6-phenyl-2,3,5,6-tetrahydroimidazo[2,1-b]thiazole present of a compound selected from the group consisting of d-10-camphorsulfonic acid and l-10-camphorsulfonic acid in a solvent in which the camphorsulfonic acid salts have a solubility of less than about 0.25% and separating the insoluble precipitated camphorsulfonic acid salts of the racemic amine leaving substantially optically pure amine in solution.

3. A method according to claim 1, wherein the solvent is selected from the group consisting of lower alkyl alcohols having 1 to 4 carbon atoms, low molecular weight aliphatic ketones having 1 to 6 carbon atoms, lower alkyl nitriles having 1 to 5 carbon atoms, halogenated lower alkyls having 1 to 4 carbon atoms and monocyclic aromatic hydrocarbons having 6 to 10 carbon atoms.

4. A method according to claim 2, wherein the solvent selected from the group consisting of lower alkyl alcohols having 1 to 4 carbon atoms, low molecular weight aliphatic ketones having 1 to 6 carbon atoms, lower alkyl nitriles having 1 to 5 carbon atoms, halogenated lower alkyls having 1 to 4 carbon atoms, and monocyclic aromatic hydrocarbons having 6 to 10 carbon atoms.

5. In a method according to claim 1, the step wherein the optically active amine is recovered from the solution of the optically active amine by precipitation as a hydrohalide salt.

6. In a method according to claim 2, the step wherein the optically pure amine is recovered from the solution of the optically pure amine by precipitation as a hydrohalide salt.

7. A method according to claim 1, for the preparation of l (—) 6-phenyl-2,3,5,6-tetrahydroimidazo[2,1-b]thiazole hydrohalide which comprises treating a chloroform solution of l (—) 6-phenyl-2,3,5,6-tetrahydroimidazo[2,1-b]thiazole d-10-camphorsulfonate with a toluene solution of dl 6-phenyl-2,3,5,6-tetrahydroimidazo[2,1-b]thiazole at a temperature between about 20° C. and 100° C. mechanically separating the precipitated complex d-10-camphorsulfonate salt, treating the mother liquor with a hydrohalide and mechanically recovering the l (—) 6-phenyl-2,3,5,6-tetrahydroimidazo[2,1-b]thiazole hydrohalide.

8. A method of producing in solution a compound selected from the group consisting of d (+) 6-phenyl-2,3,5,6-tetrahydroimidazo[2,1-b]thiazole and l (—) 6-phenyl-2,3,5,6 - tetrahydroimidazo[2,1 - b]thiazole comprising; the steps of (1) contacting a compound selected from the group consisting of d (+) 6-phenyl-2,3,5,6-tetrahydroimidazo[2,1-b]thiazole d-10-camphorsulfonate; l (—) 6-phenyl-2,3,5,6-tetrahydroimidazo[2,1-b]thiazole d-10-camphorsulfonate; l (—) 6-phenyl-2,3,5,6-tetrahydroimidazo[2,1-b]thiazole l-10-camphorsulfonate; and d (+) 6-phenyl-2,3,5,6-tetrahydroimidazo[2,1-b]thiazole l-10-camphorsulfonate with not more than one molar equivalent of dl 6-phenyl-2,3,5,6-tetrahydroimidazo[2,1-b]thiazole in a solvent selected from the group consisting of lower alkyl alcohols, lower alkyl nitriles and halogenated lower alkyls; (2) admixing with the thus formed mixture a solvent selected from the group consisting of lower molecular weight aliphatic ketones and monocyclic aromatic hydrocarbons, whereby the camphorsulfonate salt is crystallized in the thus formed mixture; (3) separating the solvent introduced in step 1 from said mixture and (4) separating the crystallized camphorsulfonate salt from the solvent stripped mixture of step 3 to obtain the substantially pure optically active amine in solution.

9. A method according to claim 8, wherein steps 1 through 3 are conducted at a temperature between about 0° C. and 200° C.

10. A method of purifying in solution an optically impure compound selected from the group consisting of d (+) 6-phenyl-2,3,5,6-tetrahydroimidazo[2,1-b]thiazole and l (—) 6-phenyl-2,3,5,6-tetrahydroimidazo[2,1-b]thiazole comprising; the steps of (1) contacting said compound with at least one mole for each mole of dl 6-phenyl-2,3,5,6-tetrahydroimidazo[2,1-b]thiazole present of a compound selected from the group consisting of d-10-camphorsulfonic acid and l-10-camphorsulfonic acid in a solvent selected from the group consisting of lower alkyl alcohols, lower alkyl nitriles and halogenated lower alkyls; (2) admixing with the thus formed mixture a solvent selected from the group consisting of lower molecular weight aliphatic ketones and monocyclic aromatic hydrocarbons, whereby the camphorsulfonate salt is crystallized in the thus formed mixture; (3) removing the solvent introduced in step 1 from said mixture and (4) separating the crystallized camphorsulfonate salt from the solvent stripped mixture of step 3 to obtain the substantially pure optically active amine in solution.

References Cited
UNITED STATES PATENTS 3,463,786   8/1969   Bullock _____ 260—306.7

ALEX MAZEL, Primary Examiner

R. J. GALLAGHER, Assistant Examiner

U.S. Cl. X.R.

260—999